US009764229B2

(12) United States Patent
Dawson

(10) Patent No.: US 9,764,229 B2
(45) Date of Patent: Sep. 19, 2017

(54) UNLOCKING OF DIGITAL CONTENT BASED ON GEO-LOCATION OF OBJECTS

(71) Applicant: Disney Enterprises, Inc., Burbank, CA (US)

(72) Inventor: C. Matthew Dawson, Highland, UT (US)

(73) Assignee: Disney Enterprises, Inc., Burbank, CA (US)

( * ) Notice: Subject to any disclaimer, the term of this patent is extended or adjusted under 35 U.S.C. 154(b) by 310 days.

(21) Appl. No.: 13/900,923

(22) Filed: May 23, 2013

(65) Prior Publication Data

US 2014/0349721 A1    Nov. 27, 2014

(51) Int. Cl.
| | |
|---|---|
| *A63F 13/216* | (2014.01) |
| *A63F 13/35* | (2014.01) |
| *A63F 13/69* | (2014.01) |
| *A63F 13/79* | (2014.01) |
| *A63H 33/26* | (2006.01) |

(52) U.S. Cl.
CPC ............ *A63F 13/216* (2014.09); *A63F 13/35* (2014.09); *A63F 13/69* (2014.09); *A63F 13/79* (2014.09); *A63H 33/26* (2013.01)

(58) Field of Classification Search
CPC .. A63F 13/69; A63F 13/216; A63F 2300/205; A63F 2300/5573
See application file for complete search history.

(56) References Cited

U.S. PATENT DOCUMENTS

| | | | |
|---|---|---|---|
| 6,682,074 B2 | 1/2004 | Weston | 273/459 |
| 6,773,344 B1 * | 8/2004 | Gabai | A63H 3/28 463/1 |
| 7,066,781 B2 | 6/2006 | Weston | 446/268 |
| 8,064,487 B1 | 11/2011 | Armstrong | |
| 8,089,458 B2 | 1/2012 | Barney et al. | 345/158 |
| 8,221,220 B2 | 7/2012 | Ackley et al. | 463/23 |
| 8,287,383 B1 * | 10/2012 | Etter et al. | 463/42 |
| 8,292,688 B2 | 10/2012 | Ganz | 446/175 |
| 8,332,544 B1 * | 12/2012 | Ralls | A63F 13/92 340/573.1 |
| 9,131,339 B1 * | 9/2015 | Kulfan | H04W 4/02 |
| 2005/0059483 A1 * | 3/2005 | Borge | 463/29 |
| 2005/0250415 A1 * | 11/2005 | Barthold | A63H 17/00 446/465 |

(Continued)

*Primary Examiner* — Milap Shah
*Assistant Examiner* — Anh Vo V Nguyen
(74) *Attorney, Agent, or Firm* — Sheppard Mullin Richter & Hampton LLP

(57) ABSTRACT

This disclosure relates to a system configured to unlock digital content related to toys associated with users. The digital content may be unlocked based on the associations between the toys and the users, and presence of objects associated with user accounts at predetermined geographic locations. The predetermined geographic locations may be locations within theme parks, restaurants, stores, and/or hotels. The toys associated with the users may include, for example, toys owned by the users. The toys may include physical toys and/or virtual toys in a virtual space. The objects associated with user accounts may include, for example, a mobile phone belonging to the user. The user accounts may be electronic accounts associated with individual users that include information related to the toys associated with users and information related to the objects.

22 Claims, 3 Drawing Sheets

(56) References Cited

U.S. PATENT DOCUMENTS

| | | | |
|---|---|---|---|
| 2007/0097832 A1* | 5/2007 | Koivisto | A63F 3/08 369/63 |
| 2008/0009351 A1* | 1/2008 | Ganz | G06Q 30/0222 463/42 |
| 2008/0062120 A1 | 3/2008 | Wheeler et al. | 345/156 |
| 2008/0167129 A1* | 7/2008 | Aaron et al. | 463/42 |
| 2008/0274811 A1* | 11/2008 | Ganz | A63F 13/12 463/42 |
| 2008/0306825 A1* | 12/2008 | Schick | G06Q 30/02 705/14.39 |
| 2009/0158210 A1* | 6/2009 | Cheng | G06Q 30/0224 715/810 |
| 2010/0076970 A1 | 3/2010 | Bates | |
| 2010/0130286 A1* | 5/2010 | Ackley et al. | 463/42 |
| 2010/0144434 A1* | 6/2010 | Leingang et al. | 463/35 |
| 2010/0162149 A1 | 6/2010 | Sheleheda | |
| 2010/0274902 A1* | 10/2010 | Penman | A63F 13/28 709/227 |
| 2010/0293473 A1* | 11/2010 | Borst | H04L 12/1827 715/741 |
| 2010/0302143 A1 | 12/2010 | Spivack | |
| 2010/0304804 A1 | 12/2010 | Spivack | |
| 2011/0086702 A1* | 4/2011 | Borst | A63F 13/10 463/30 |
| 2011/0124399 A1* | 5/2011 | Dutilly et al. | 463/25 |
| 2011/0300941 A1 | 12/2011 | Weston et al. | 463/37 |
| 2012/0052953 A1* | 3/2012 | Annambhotla | A63F 13/10 463/40 |
| 2012/0129590 A1 | 5/2012 | Morrisroe | |
| 2012/0149475 A1* | 6/2012 | Schick | G06Q 30/0239 463/42 |
| 2012/0196682 A1* | 8/2012 | Xu et al. | 463/40 |
| 2012/0208641 A1* | 8/2012 | Bogan | G06Q 30/06 463/42 |
| 2012/0214589 A1* | 8/2012 | Dixon | A63F 13/95 463/31 |
| 2012/0233076 A1* | 9/2012 | Sutcliffe | G06Q 30/02 705/50 |
| 2012/0264518 A1* | 10/2012 | Rouille | A63F 13/12 463/39 |
| 2012/0276993 A1 | 11/2012 | Lerner | |
| 2012/0295704 A1* | 11/2012 | Reiche | A63F 13/06 463/31 |
| 2012/0310713 A1* | 12/2012 | Mercuri | G06Q 30/0207 705/14.1 |
| 2012/0322548 A1 | 12/2012 | Isgreen | 463/29 |
| 2012/0323654 A1 | 12/2012 | Writer | 705/14.16 |
| 2013/0006735 A1* | 1/2013 | Koenigsberg | G06Q 30/02 705/14.12 |
| 2013/0054422 A1* | 2/2013 | DeSouza et al. | 705/27.1 |
| 2013/0072308 A1* | 3/2013 | Peck | A63F 13/12 463/42 |
| 2013/0095927 A1 | 4/2013 | Rietman | |
| 2013/0117377 A1 | 5/2013 | Miller | |
| 2013/0231193 A1* | 9/2013 | Heatherly | A63H 3/28 463/42 |
| 2013/0296058 A1* | 11/2013 | Leyland | A63F 13/95 463/42 |
| 2013/0324241 A1* | 12/2013 | Elliott | A63H 30/00 463/31 |
| 2014/0011428 A1* | 1/2014 | Barthold | A63H 3/003 446/268 |
| 2014/0121008 A1* | 5/2014 | Canessa | A63F 13/02 463/29 |
| 2014/0273721 A1* | 9/2014 | Katan | A63H 3/36 446/268 |
| 2014/0274313 A1* | 9/2014 | Bala | G06Q 30/06 463/25 |
| 2015/0050995 A1* | 2/2015 | Nelson | A63F 13/79 463/31 |

* cited by examiner

UNLOCKING OF DIGITAL CONTENT BASED ON GEO-LOCATION OF OBJECTS

FIELD OF THE DISCLOSURE

This disclosure relates to a system configured to unlock digital content related to toys associated with users. The digital content may be unlocked based on the associations between the toys and the users, and presence of objects associated with user accounts at predetermined geographic locations.

BACKGROUND

Systems configured to update digital content responsive to detecting a physical toy in and/or on a reader are known. For example, video gaming systems update game information based on information related to previous game play that is stored on physical toys. Transporting physical toys to readers is not always practical and/or desired. For example, toys may have an importance such that the risk of losing them outweighs the desire to transport them to the reader.

SUMMARY

One aspect of the disclosure relates to a system configured to unlock digital content related to toys associated with users. The digital content may be unlocked based on the associations between the toys and the users and presence of objects at predetermined geographic locations. The digital content related to the toys may be unlocked even though the toys are not physically present in the predetermined geographic locations. A given object may be associated with an individual user account that includes information related to the given object, a given user, one or more toys associated with the given user, and/or other information. The objects may be carried by the users to the predetermined geographic locations. The predetermined geographic locations may be within a theme park, a restaurant, a store, a hotel, and/or other venues. The system may comprise one or more objects, one or more sensors, one or more processors, and/or other components.

The one or more sensors may be configured to generate output signals conveying information related to presence of the objects in the predetermined geographic locations. The predetermined geographic locations may include a first predetermined geographic location within a theme park, for example.

The one or more processors may be configured to execute computer program modules. The computer program modules may comprise a user module, a location module, an unlock module, and/or other modules.

The user module may be configured to maintain the user accounts. The user accounts may be associated with individual users. The user accounts may include information related to the toys associated with users, information related to the objects, and/or other information. For example, the user accounts may include a first user account associated with a first user. The first user account may include information related to a first toy associated with the first user and a first object.

The location module may be configured to detect whether the objects are in the predetermined geographic locations. The location module may be configured to detect whether the objects are in the predetermined geographic locations based on the output signals. For example, the location module may be configured to detect whether the first object is in the first predetermined geographic location.

The unlock module may be configured to unlock the digital content related to the toys associated with the users. The unlock module may be configured to unlock the digital content responsive to detection of the objects in the predetermined geographic locations. For example, responsive to a first detection indicating that the first object has been detected in the first predetermined geographic location, first digital content associated with the first toy is unlocked to reflect the first detection.

In some implementations, the unlock module may configured such that the unlocking of the digital content related to the toys associated with the users comprises effectuating presentation of the digital content in or near the geographic locations. The unlock module may be configured such that the digital content includes one or more of a mini-game, a movie, a movie preview, at least a portion of a scavenger hunt, and/or other digital content. In some implementations, the unlock module is configured such that the unlocking of the digital content related to the toys associated with the users comprises unlocking virtual content related to the toys within a virtual space. The virtual content related to the toys within a virtual space may comprise one or more of a skill, a language, a power, a quest, a pet, a level, a ride, a weapon, a character, a virtual good, a scene, and/or other virtual content.

In some implementations, the unlock module may be configured such that the unlocked digital content is available for immediate and/or later engagement by the users via the objects associated with the user accounts. The unlock module may be configured such that the unlocked digital content is available for engagement by the users via gaming consoles and/or other devices. In some implementations, the unlock module may be configured to temporarily unlock the digital content related to the toys associated with the users until the objects are no longer detected in the predetermined geographic locations by the location module.

The user module is configured to update the information in the user accounts to include information related to toys purchased by the users in the theme park, for example. The user module may be configured such that the toys associated with the users include physical toys in the physical world, virtual toys in a virtual space, and/or other toys.

In some implementations, the location module may be configured to detect whether the first object has been in the first predetermined geographic location and then one or more additional geographic locations (e.g., a second predetermined geographic location). The unlock module may be configured to unlock second digital content responsive to a specific order of detections of the first object in the predetermined geographic areas. For example, during a scavenger hunt, the unlock module may be configured to unlock second digital content responsive to detection of the first object in the first predetermined geographic location and then the second predetermined geographic location.

In some implementations, the objects include one or more of a mobile device, a mobile phone, a tablet computer, a laptop computer, a wristband, a watch, and/or other objects.

Another aspect of the disclosure relates to a method for unlocking digital content related to toys associated with users. The digital content may be unlocked based on the associations between the toys and the users, and presence of objects associated with user accounts at predetermined geographic locations. The predetermined geographic locations may be within a theme park, a restaurant, a store, a hotel, and/or other venues.

The method may include generating output signals conveying information related to presence of the objects in the predetermined geographic locations. The predetermined geographic locations may include a first predetermined geographic location, for example.

The method may include maintaining the user accounts. The user accounts may be associated with individual users. The user accounts may include information related to the toys associated with users, information related to the objects, and/or other information. For example, the user accounts may include a first user account associated with a first user. The first user account may include information related to a first toy associated with the first user and a first object associated with the first user account.

The method may include detecting whether the objects are in the predetermined geographic locations based on the output signals. The detecting may include detecting whether the first object is in the first predetermined geographic location, for example.

The method may include unlocking the digital content related to the toys associated with the users. The unlocking may be responsive to detection of the objects in the predetermined geographic locations. For example, responsive to a first detection indicating that the first object has been detected in the first predetermined geographic location, first digital content associated with the first toy may be unlocked to reflect the first detection.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
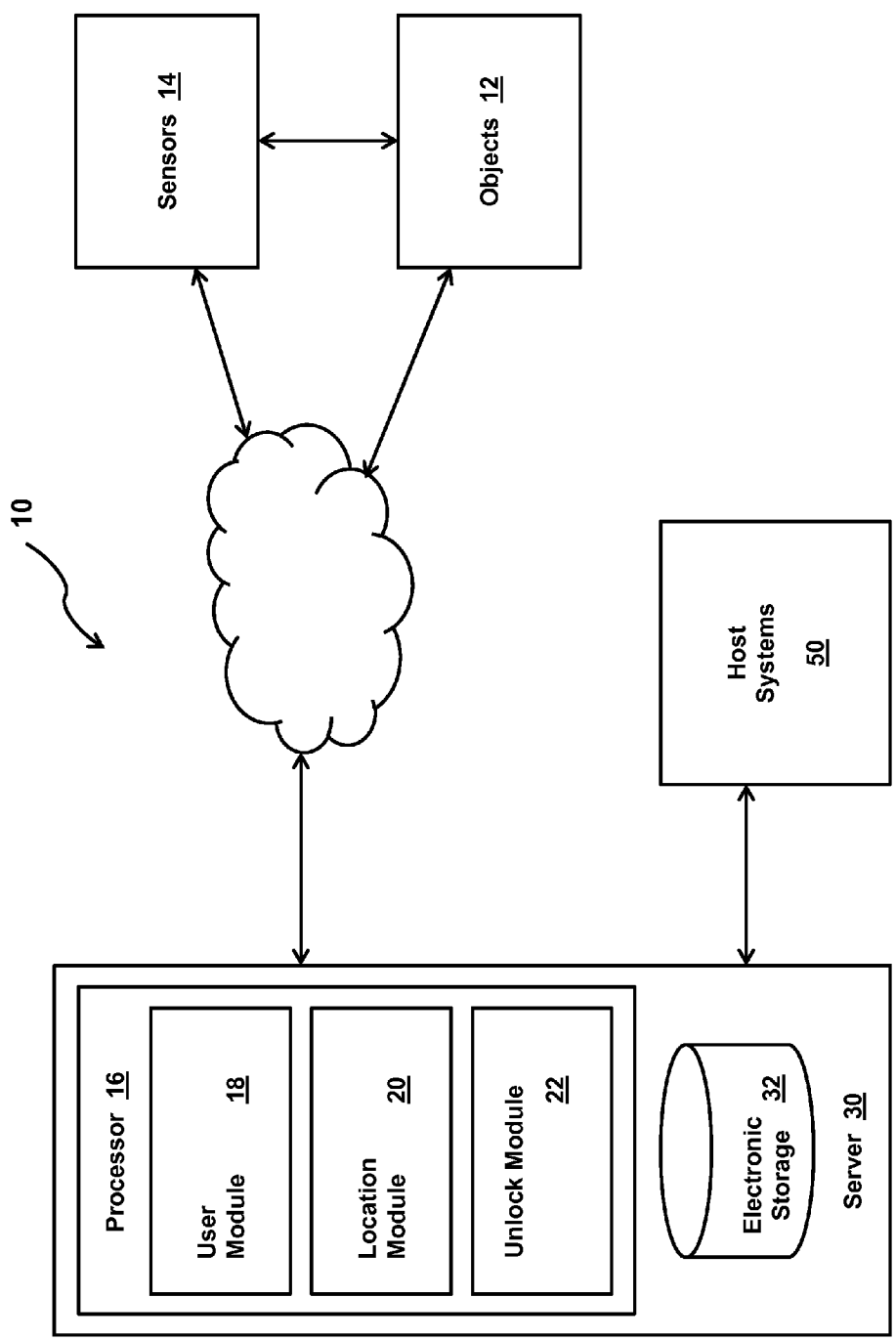
FIG. 1 illustrates a system configured to unlock digital content related to toys associated with users.

FIG. 1 illustrates a system 10 configured to unlock digital content related to toys associated with users. The digital content may be unlocked based on the associations between the toys and the users, presence of objects 12 associated with user accounts detected at predetermined geographic locations, and/or other information. The predetermined geographic locations may be locations within theme parks, restaurants, stores, hotels, and/or other venues. The toys associated with the users may include, for example, toys owned by the users. The toys may include physical toys, virtual toys in a virtual space, and/or other toys. Objects 12 associated with user accounts may include, for example, a mobile phone belonging to the user and/or a companion of the user (e.g., a parent) and/or other objects that may be transported by a user to one or more of the geographic locations where objects 12 are detected. The user accounts may be electronic accounts associated with individual users that include information related to the toys associated with users, information related to objects 12, and/or other information.

System 10 may facilitate interaction between users and their toys during a visit to a venue (e.g., a theme park) without requiring the toys to be physically present with the user. By not requiring the toys to be physically present, and facilitating interaction with them via system 10, the toys may be kept safe and not be lost and/or damaged during the visit.

The unlocked digital content may augment the experience of users during visits to a theme park, a restaurant, a store, a hotel, and/or other venues. Augmenting may include providing additional experiences, presentations, interactions and/or other enhancements beyond what is normally provided. For example, augmenting may include unlocking a mini-game related to the toys owned by the user and the user's location in the venue, presenting a movie and/or a movie preview featuring the toys, facilitating a scavenger hunt (e.g., within a theme park), unlocking virtual content related to the toys within a virtual space (e.g., unlocking a new video game level), and/or other augmentation. In some implementations, users may engage the unlocked digital content immediately (e.g., while in a predetermined geographic location). In some implementations, users may engage the unlocked digital content at a later time (e.g., at a hotel after leaving a theme park for the day). In some implementations, users may engage the unlocked digital content from home (e.g., during video game play). In some implementations, users may engage the unlocked digital content with objects 12, game consoles, computers, and/or other devices.

By way of a non-limiting example, system 10 may unlock a Toy Story scavenger hunt for an individual guest at Disneyland. The user account associated with the guest may indicate that the guest owns a Buzz Lightyear toy. Responsive to the guest riding the Buzz Lightyear Astro Blasters ride (e.g., a predetermined geographic location), system 10 may be configured to facilitate presentation of the first step in the scavenger hunt via a mobile phone (e.g., object 12) associated with the guest, via a display located near the ride exit, and/or via other devices. System 10 may be configured to continue to facilitate presentation of further steps in the scavenger hunt throughout the guest's visit to Disneyland responsive to the mobile phone associated with the guest being detected in one or more additional predetermined geographic locations.

In some implementations, system 10 may include one or more objects 12, one or more sensors 14, one or more processors 16, one or more servers 30, host systems 50, and/or other components. The components of system 10 may be operatively linked via one or more electronic communication links. For example, such electronic communication links may be established, at least in part, via a wireless network such as the Internet and/or other networks. In some implementations, the components of system 10 may be configured to communicate directly with each other. It will be appreciated that this is not intended to be limiting, and that the scope of this disclosure includes implementations in which objects 12, sensors 14, processors 16, servers 30, host systems 50, and/or other components may be operatively linked via some other communication media, or with linkages not shown in FIG. 1.

Objects 12 may be standalone physical objects. Objects 12 may be configured to be detectable by sensors 14. In some implementations, objects 12 may be detectable based on signals conveying information associated with objects 12. In some implementations, objects 12 may include one or more components that may be detected by sensors 14. Detection of objects 12 may be facilitated by electronics embedded within or otherwise included in objects 12. Objects 12 may include radio frequency identification (RFID) tags, components related to Wi-Fi technology, components related to cellular network communication, components related to GPS technology, and/or other components. In some implementations, objects 12 may be configured to be detected by sensors 14 responsive to objects 12 being in proximity to sensors 14 (e.g., via Wi-Fi, RFID). In some implementations objects 12 may be located far from sensors 14 and still be detected by sensors 14 (e.g., via GPS). In some implementations, objects 12 may be detected by sensors 14 based on changes in the field of view of sensors 14 (e.g., when sensors 14 are spatial presence sensors as described below). For example, sensors 14 may detect presence of objects 12 responsive to objects 12 crossing through and/or interrupting a light beam between two sensors 14 that defines a border of a predetermined geographic location.

Objects 12 may include one or more processors configured to provide information processing capability in objects 12, a display configured to present visual information to a user, one or more speakers configured to present audio information to a user, one or more user interfaces configured to receive entry and/or selection of information from a user, and/or other components. For example, objects 12 may include one or more of a smart phone, a tablet computer, a laptop computer, a smart watch, and/or other objects.

Objects 12 may be electronically associated with user accounts. In some implementations, individual objects 12 may be associated with individual users. In some implementations, objects 12 may include the personal mobile devices of the guests, devices distributed by a theme park upon guests entering a theme park, and/or other electronic devices. The form factor of objects 12 associated with individual guests may include a wearable accessory embedded with one or more components that may be detected by sensors 14 such as a bracelet, a wristband, a necklace, and/or other form factors. The form factor of objects 12 may include a device configured to be carried, such as a card, a toy, a disc, a puck, and/or other devices.

Sensors 14 may be configured to generate output signals conveying information related to presence of objects 14 in the predetermined geographic locations. Sensors 14 may be configured such that generating output signals conveying information related to presence of objects 14 in the predetermined geographic locations includes generating output signals conveying the current location of objects 14 via GPS technology, cellular network technology, Wi-Fi technology, RFID technology, and/or other technology. The generation of output signals may be facilitated by the electronics embedded within or otherwise included in objects 12.

In some implementations, sensors 14 may utilize GPS satellites, cell phone towers in proximity to the venue, and/or other devices to generate the output signals conveying information related to the presence of objects 14 in the predetermined geographic locations. In some implementations, sensors 14 may be disposed in a plurality of sensing locations in and/or around the predetermined geographic locations. The sensing locations may include locations in tables, the ceiling, doorways, walls, floor, furniture, outdoor features (e.g., lamp posts, cones, railings, etc.), outdoor landscaping, and/or other locations.

In some implementations, the output signals of sensors 14 may be configured to convey information related to the relative physical positions of the sensors in and/or around a predetermined geographic location. For example, sensors 14 may include sensors associated with multiple separate and distinct predetermined geographic locations. Output signals from sensors associated with a first predetermined geographic location may include information related to a relative physical position of the first predetermined geographic location. The output signals from the sensors associated with a second predetermined geographic location may include information related to a relative physical position of the second predetermined geographic location. The output signals from the sensors associated with a third predetermined geographic location may include information related to a relative physical position of the third predetermined geographic location.

In some implementations, sensors 14 may be configured to send outbound signals to objects 12, and/or receive inbound signals from objects 12. In some implementations, the inbound signals received by sensors 14 from objects 12 may include signal strengths related to distances between sensors 14 objects 12. The signal strengths may be stronger when objects 12 are closer to sensors 14. The signal strengths may be weaker when objects 12 are farther from sensors 14. For example, sensors 14 associated with the first predetermined geographic location may have a stronger signal relative to sensors 14 associated with the second predetermined geographic location responsive to a given object 12 being in the first predetermined geographic location closer to sensors 14 associated with the first predetermined geographic location than sensors 14 associated with the second predetermined geographic location.

Figure 2:
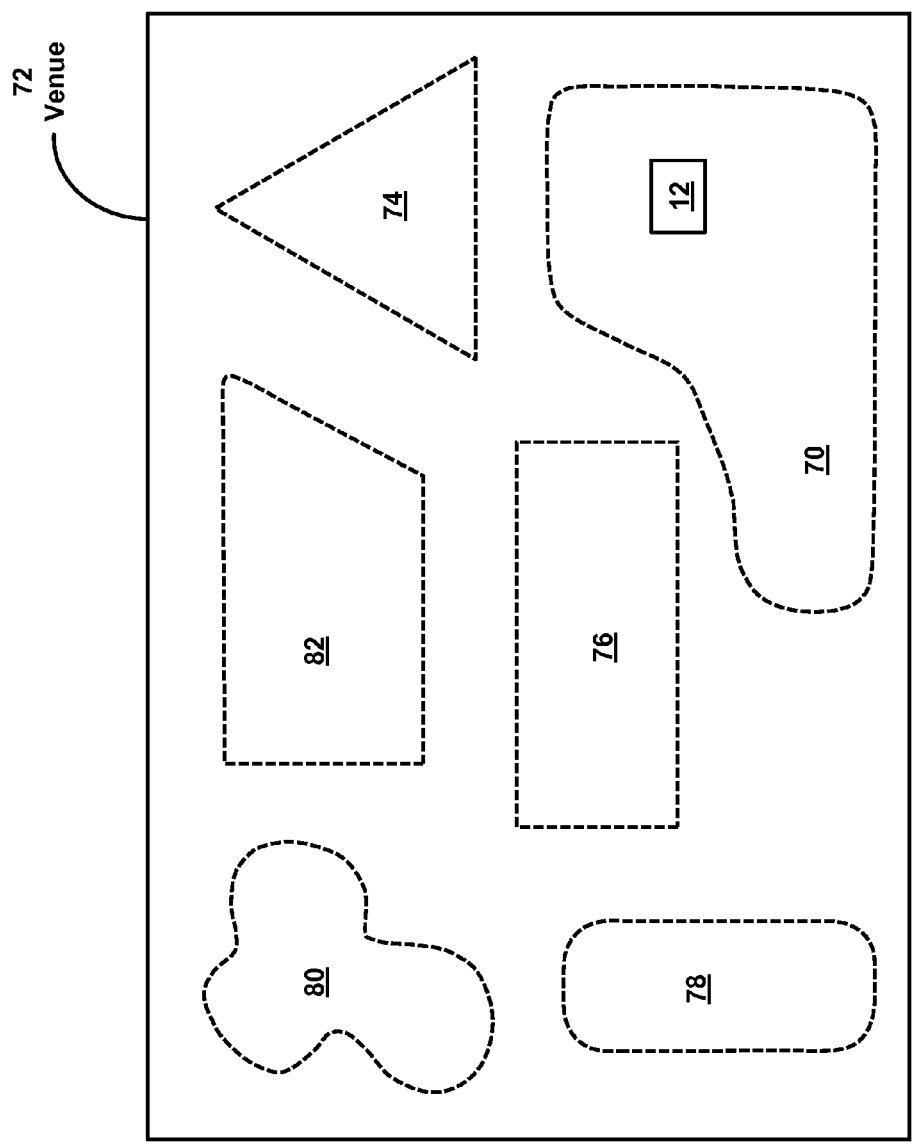
FIG. 2 illustrates an individual object located in a first predetermined geographical location within a venue.

For example, FIG. 2 illustrates an individual object 12 located in a first predetermined geographical location 70 within a venue 72. Venue 72 includes predetermined geographical locations 70, 74, 76, 78, 80, and 82. The predetermined geographical locations may have different sizes and shapes and may be located throughout venue 72. Sensors (e.g., sensors 14) may generate output signals used to detect whether object 12 is currently in one of the predetermined geographical locations and which predetermined geographical locations object 12 is currently in.

Returning to FIG. 1, in some implementations, sensors 14 may include one or more spatial presence sensors configured to generate output signals conveying information related to presence of objects 12 in the predetermined geographic locations based on changes in the field of view of the spatial presence sensors. For example, sensors 14 may include motion sensors configured to detect motion of an object 12 in a predetermined geographic area. Sensors 14 may include infrared sensors configured to detect heat from an object 12 in a predetermined geographic area. Sensors 14 may include optical sensors configured to detect presence of objects responsive to changes in the optical field of view of sensors 14 caused by objects 12. Sensors 14 may detect presence of objects 12 responsive to objects 12 crossing through and/or interrupting a light beam between two sensors 14 that defines a border of a predetermined geographic location.

Server 30 may comprise one or more processors 16, electronic storage 32, and/or other components. Server 30 may include communication lines, or ports to enable the exchange of information with a network and/or other computing platforms. Server 30 may include a plurality of hardware, software, and/or firmware components operating together to provide the functionality attributed herein to server 30, processor 16, and/or other components. For example, server 30 may be implemented by a cloud of computing platforms operating together as a system server.

As shown in FIG. 1, processor 16 may be configured to execute one or more computer program modules. The computer program modules may comprise one or more of a user module 18, a location module 20, an unlock module 22, and/or other modules.

User Module 18 may be configured to maintain the user accounts. The user accounts may be associated with individual users. The user accounts may include information related to the toys associated with users, objects 12 associated with the user accounts, and/or other information. User module 18 may be configured such that the toys associated with the users include physical toys in the physical world, virtual toys in a virtual space, and/or other toys. For example, the user accounts may include a first user account associated with a first user. The first user account may include information related to a first toy associated with the first user (e.g., a Buzz Lightyear doll and/or a Buzz Lightyear character in a virtual space) and a first object 12 associated with the first user account (e.g., a mobile phone). User module 18 may be configured such that the information in the user accounts is stored electronically on server 30 (e.g., in electronic storage 32) and/or in other locations.

In some implementations, user module 18 is configured to update the information in the user accounts to include information related to toys purchased and/or otherwise acquired by the users during a visit to a venue. For example, a user may purchase a Woody doll during a visit to Disneyland. The Woody doll may include a unique identifier (e.g., a serial number, a bar code, etc.). Responsive to information related to the unique identifier being received by user module 18, user module 18 may update the information in the user account to reflect the purchase. In this example, the user may upload the information via an object 12, the information may be transmitted by host systems 50 (e.g., directly from the point of sale device), and/or received by user module 18 via other methods.

Location Module 20 may be configured to detect whether objects 12 are in the predetermined geographic locations. Location module 20 may be configured to detect whether objects 12 are in the predetermined geographic locations based on the output signals from sensors 14. For example, location module 20 may be configured to detect whether the first object 12 is in the first predetermined geographic location (e.g., first predetermined geographic location 70 shown in FIG. 2).

Unlock Module 22 may be configured to unlock the digital content related to the toys associated with the users. Unlock module 22 may be configured to unlock the digital content responsive to detection of objects 12 in the predetermined geographic locations. For example, responsive to a first detection indicating that the first object 12 has been detected in the first predetermined geographic location (e.g., first predetermined geographic location 70 shown in FIG. 2), first digital content associated with the first toy is unlocked to reflect the first detection. In some implementations, unlock module 22 may be configured such that the unlocking of the digital content related to the toys associated with the users comprises effectuating presentation of the digital content in or near the geographic locations. For example, unlock module 22 may be configured to effectuate presentation on a mobile phone (e.g., object 12) associated with a user, on a display screen of a host system 50, and/or on other devices.

In some implementations, unlock module 22 may be configured such that the digital content includes one or more of a mini-game, a movie, a movie preview, at least a portion of a scavenger hunt, and/or other digital content. In some implementations, unlock module 22 is configured such that the unlocking of the digital content related to the toys associated with the users comprises unlocking virtual content related to the toys within a virtual space. In some implementations, unlock module 22 is configured such that the virtual content related to the toys within a virtual space comprises one or more of a skill, a language, a power, a quest, a pet, a level, a ride, a weapon, a character, a virtual good, a scene, and/or other virtual content.

Unlock module 22 and/or objects 12 may be configured such that the unlocked digital content is available for immediate and/or later engagement by the users via objects 12. For example, users may engage the unlocked digital content immediately via a mobile device belonging to the user. In some implementations, unlock module 22 may be configured such that users may engage the unlocked digital content at a later time. For example, users may engage the unlocked digital content on their mobile device at a hotel after leaving a theme park for the day. In some implementations, users may engage the unlocked digital content from home. For example, the users may engage the unlocked digital content via a home computer. In some implementations, unlock module 22 may be configured to temporarily unlock the digital content related to the toys associated with the users until objects 12 are no longer detected in the predetermined geographic locations by location module 20.

In some implementations, unlock module 22 may be configured such that the unlocked digital content is available for engagement by the users via gaming consoles. The gaming consoles may be configured to enable an expert and/or user associated with a given console to interface with system 10, host systems 50, and/or other external resources. By way of non-limiting example, the given console may include one or more of a video game system (e.g., Microsoft Xbox), a desktop computer, a laptop computer, a handheld computer, a NetBook, a Smartphone, and/or other computing platforms.

In some implementations, unlock module 22 may be configured to unlock digital content based on a series of detections by location module 20 in a series of predetermined geographic locations. For example, during a scavenger hunt, responsive to a given object 12 moving from a first predetermined geographic location (e.g., first predetermined geographic location 70 shown in FIG. 2) to a second predetermined geographic location (e.g., predetermined geographic location 74 shown in FIG. 2), sensors 14 may generate output signals conveying information related to presence of the given object 12 in the first predetermined geographic location and then the second predetermined geographic location. Location module 20 may be configured to detect whether the given object 12 has been in the first predetermined geographic location and then the second predetermined geographic location. Unlock module 22 may configured to unlock second digital content responsive to detection of the given object 12 in the first predetermined geographic location and then the second predetermined geographic location.

In some implementations, unlock module 22 may be configured such that the unlocking of the digital content related to the toys associated with the users comprises unlocking incentives that are redeemable in the physical world. For example, unlock module 22 may be configured to unlock a digital coupon (e.g., sent via email, text, and/or displayed on a smart phone) that may be redeemed when buying a physical toy in the real world. The incentive may be related to the predetermined geographical areas visited by object 12.

Host Systems 50 may include one or more systems configured to manage guest entry into a theme park, a restaurant, a hotel, and/or other venues; one or more point of sale systems configured to transmit information related to toy purchases by users, one or more databases storing guest information; one or more enterprise systems configured to manage bookings and/or reservations by guests; one or more systems configured to obtain guest information, and/or other systems. For example, host systems 50 may include a system configured to associate individual toys and/or individual objects 12 with corresponding individual user accounts prior to and/or upon entry into a venue (e.g., a theme park). Host systems 50 may obtain guest information via facilitation of a series of web activities, questionnaires, and games. Host systems 50 may obtain additional data about guests throughout their stay at a theme park, for example, such as where the guest is staying, what rides the guests ride and when, future plans made by guests, with whom the guest travels around the theme park, and/or other information.

In some implementations, host systems 50 may include display systems configured to display the unlocked digital content to the users while the users are in or near the predetermined geographic locations. For example, responsive to unlock module 22 unlocking digital content for a user who owns a Buzz Lightyear doll and has just finished riding the Buzz Lightyear Astro Blasters ride, host systems 50 may be configured to facilitate presentation of the first step in the scavenger hunt via a display located near the ride exit, and/or via other devices.

In some implementations, host systems 50 may include systems configured to sell virtual toys to users and facilitate transferring information related to the sale to user module 18 such that the information related to the newly purchased virtual toy is included in the corresponding user account.

Electronic storage 32 may comprise electronic storage media that electronically stores information. The electronic storage media of electronic storage 32 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 32 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 32 may store software algorithms, information determined by processor 16, and/or other information that enables system 10 to function properly. Electronic storage 32 may be (in whole or in part) a separate component within system 10, or electronic storage 32 may be provided (in whole or in part) integrally with one or more other components of system 10 (e.g., server 30).

Processor 16 may be configured to provide information processing capabilities in system 10. As such, processor 16 may comprise one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may comprise a plurality of processing units. These processing units may be physically located within the same device (e.g., server 30), or processor 16 may represent processing functionality of a plurality of devices operating in coordination (e.g., server 30 and objects 12). Processor 16 may be configured to execute modules 18, 20, and/or 22 by software; hardware; firmware; some combination of software, hardware, and/or firmware; and/or other mechanisms for configuring processing capabilities on processor 16.

It should be appreciated that although modules 18, 20, and 22 are illustrated in FIG. 1 as being co-located within a single processing unit, in implementations in which processor 16 comprises multiple processing units, one or more of modules 18, 20, and/or 22 may be located remotely from the other modules (e.g., such as within an object 12). The description of the functionality provided by the different modules 18, 20, and/or 22 described herein is for illustrative purposes, and is not intended to be limiting, as any of modules 18, 20, and/or 22 may provide more or less functionality than is described. For example, one or more of modules 18, 20, and/or 22 may be eliminated, and some or all of its functionality may be provided by other modules 18, 20, and/or 22. As another example, processor 16 may be configured to execute one or more additional modules that may perform some or all of the functionality attributed below to one of modules 18, 20, and/or 22. In some implementations, one or more of modules 18, 20, and/or 22 may be executed by a processor incorporated in objects 12.

Figure 3:
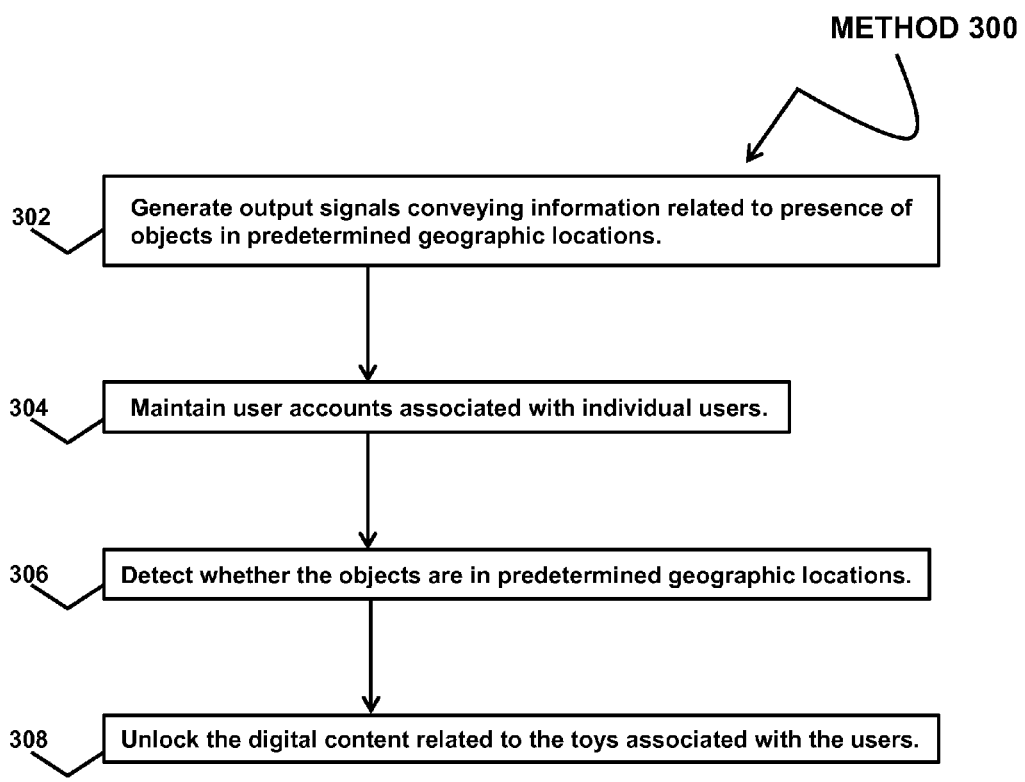
FIG. 3 illustrates a method for unlocking digital content related to toys associated with users.

FIG. 3 illustrates a method 300 for unlocking digital content related to toys associated with users. The digital content is unlocked based on the associations between the toys and the users, and presence of objects associated with user accounts at predetermined locations within a venue (e.g., a theme park, a restaurant, a hotel, a store, etc.). The operations of method 300 presented below are intended to be illustrative. In some implementations, method 300 may be accomplished with one or more additional operations not described, and/or without one or more of the operations discussed. Additionally, the order in which the operations of method 300 are respectively illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, output signals conveying information related to presence of the objects in the predetermined geographic locations may be generated. For example, the predetermined geographic locations may include a first predetermined geographic location. Operation 302 may be performed by one or more sensors that are the same as or similar to sensors 14 (shown in FIG. 1 and described herein).

At an operation 304, the user accounts may be maintained. The user accounts may be associated with individual users. The user accounts may include information related to the toys associated with users and the objects associated with the user accounts. For example, the user accounts may include a first user account associated with a first user. The first user account may include information related to a first toy associated with the first user and a first object associated with the first user account. Operation 304 may be performed by a computer program module that is the same as or similar to user module 18 (shown in FIG. 1 and described herein).

At an operation 306, whether the objects are in the predetermined geographic locations is detected based on the output signals. For example, the detecting may include detecting whether the first object is in the first predetermined geographic location. Operation 306 may be performed by a computer program module that is the same as or similar to location module 20 (shown in FIG. 1 and described herein).

At an operation 308, the digital content related to the toys associated with the users may be unlocked responsive to detection of the objects in the predetermined geographic locations. For example, responsive to a first detection indicating that the first object has been detected in the first predetermined geographic location, first digital content associated with the first toy may be unlocked to reflect the first detection.

In some implementations, the unlocking of the digital content related to the toys associated with the users includes effectuating presentation of the digital content in or near the geographic locations. In some implementations, the digital content includes one or more of a mini-game, a movie, a movie preview, at least a portion of a scavenger hunt, and/or other digital content.

In some implementations, the unlocking of the digital content related to the toys associated with the users includes unlocking virtual content related to the toys within a virtual space. The virtual content related to the toys within a virtual space may comprise one or more of a skill, a language, a power, a quest, a pet, a level, a ride, a weapon, a character, a virtual good, a scene, and/or other virtual content.

In some implementations, the unlocked digital content may be available for immediate and/or later engagement by the users via the objects associated with the user accounts. In some implementations, the unlocking of the digital content related to the toys associated with the users may include temporarily unlocking the digital content related to the toys associated with the users until the objects are no longer detected in the predetermined geographic locations. Operation 308 may be performed by a computer program module that is the same as or similar to unlock module 22 (shown in FIG. 1 and described herein).

In some implementations, the method includes generating output signals conveying information related to presence of objects in more than one geographic location, then detecting whether the objects have been in more than one geographic location, and unlocking digital content responsive to detection of the objects in multiple geographic locations. In some implementations, individual portions of a whole piece of digital content may be unlocked responsive to detection in successive geographic locations (e.g., as in a scavenger hunt).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to unlock digital content in a virtual space implemented on client computing platforms associated with users, the unlocked digital content being related to toys that are associated with user accounts of the users, the digital content being unlocked based on presence of objects associated with the user accounts at one or more predetermined geographic locations within a theme park, wherein the objects are separate and distinct from the toys, the system comprising:
    one or more sensors configured to generate output signals conveying information related to presence of the objects in the one or more predetermined geographic locations, the one or more predetermined geographic locations including a first predetermined geographic location; and
    one or more physical processors configured by machine-readable instructions to:
        maintain the user accounts associated with the users of the virtual space, individual user accounts being associated with individual users, an individual user account including:
            an association of one or more toys with the individual user account, individual ones of the one or more toys being related to digital content; and
            an association of one or more objects with the individual user account;
        the user accounts including a first user account, the first user account being associated with a first user, the first user account including information indicating an association of a first toy with the first user account, an association of a second toy with the first user account, and an association of a first object with the first user account, the first object being separate and distinct from the first toy and the second toy, the first toy being related to first digital content based on the first digital content featuring depictions and/or representations of the first toy, the second toy being related to second digital content based on the second digital content featuring depictions and/or representations of the second toy;
        determine whether the objects are in the predetermined geographic locations based on the output signals, including determining whether the first object is in the first predetermined geographic location; and
        responsive to determination of the objects being in the predetermined geographic locations, unlock the digital content related to the toys associated with the user accounts within the virtual space, the digital content being accessible via client computing platforms associated with the users, such that responsive to a first determination that the first object has been detected in the first predetermined geographic location, both the first digital content related to the first toy associated with the first user account and the second digital content related to the second toy associated with the first user account are unlocked within an instance of the virtual space that is implemented on a first client computing platform associated with the first user.

2. The system of claim 1, wherein unlocking of the digital content related to the toys associated with the users further comprises effectuating presentation of the digital content on display devices in or near the geographic locations.

3. The system of claim 2, wherein the first digital content includes a movie preview featuring the first toy, and the second digital content includes a movie preview feature the second toy.

4. The system of claim 1, wherein unlocking of the digital content related to the toys associated with the users comprises unlocking virtual content related to the toys within instances of the virtual space implemented on client computing platforms associated with the users.

5. The system of claim 4, wherein the virtual content related to the toys within a virtual space comprises one or more of a skill, a language, a power, a quest, a pet, a level, a ride, a weapon, a character, a virtual good, or a scene.

6. The system of claim 1, wherein the unlocked digital content is further available for immediate and/or later access by the users via the objects associated with the user accounts.

7. The system of claim 1, wherein the client computing platforms comprise gaming consoles.

8. The system of claim 1, wherein the one or more physical processors are further configured by machine-readable instructions to temporarily unlock the digital content related to the toys associated with the users until the objects are no longer detected in the predetermined geographic locations.

9. The system of claim 1, wherein the one or more physical processors are further configured by machine-readable instructions to update the information in the user accounts to include information related to toys purchased by the users in the theme park.

10. The system of claim 1, wherein the toys associated with the users include physical toys in the physical world and/or virtual toys in a virtual space.

11. The system of claim 1, wherein the one or more sensors are configured to generate output signals conveying information related to presence of the first object in the first predetermined geographic location and a second predetermined geographic location, wherein the one or more physical processors are further configured by machine-readable instructions to detect whether the first object has been in the first predetermined geographic location and then the second predetermined geographic location, such that third digital content is unlocked responsive to detection of the first object in the first predetermined geographic location and then the second predetermined geographic location.

12. The system of claim 1, wherein the objects include one or more of a mobile device, a mobile phone, a tablet computer, a laptop computer, a wristband, or a watch.

13. The system of claim 1, wherein the unlocking of the digital content related to the toys associated with the users further comprises unlocking incentives that are redeemable in the physical world.

14. The system of claim 1, wherein the one or more sensors include one or more spatial presence sensors configured to generate output signals conveying information related to presence of the objects in the predetermined geographic locations based on changes in the field of view of the spatial presence sensors.

15. A method for unlocking digital content in a virtual space implemented on client computing platforms associated with users, the unlocked digital content being related to toys that are associated with user accounts of the users, the digital content being unlocked based on presence of objects associated with the user accounts of the users at one or more predetermined geographic locations within a theme park, wherein the objects are separate and distinct from the toys, the method comprising:

generating output signals conveying information related to presence of the objects in the one or more predetermined geographic locations, the one or more predetermined geographic locations including a first predetermined geographic location;

maintaining the user accounts associated with the users of the virtual space, individual user accounts being associated with individual users, an individual user account including;

an association of one or more toys with the individual user account, individual ones of the one or more toys being related to digital content; and an association of one or more objects with the individual user account;

the user accounts include a first user account, the first user account being associated with a first user, the first user account including information indicating an association of a first toy with the first user account, an association of a second toy with the first user account, and an association of a first object with the first user account, the first object being separate and distinct from the first toy and second toy, the first toy being related to first digital content based on the first digital content featuring depictions and/or representations of the first toy, the second toy being related to second digital content based on the second digital content featuring depictions and/or representations of the second toy;

determining whether the objects are in one or more of the one or more predetermined geographic locations based on the output signals, including determining whether the first object is in the first predetermined geographic location; and responsive to determination of the objects being in one or more of the one or more predetermined geographic locations, unlocking the digital content related to the toys associated with the users of the user accounts within the virtual space, the digital content being accessible via client computing platforms associated with the users, including responsive to a first determination that the first object has been detected in the first predetermined geographic location, unlocking both the first digital content related to the first toy associated with the first user and the second digital content related to the second toy associated with the first user account within an instance of the virtual space that is implemented on a first client computing platform associated with the first user.

16. The method of claim 15, wherein the unlocking of the digital content related to the toys associated with the users further comprises effectuating presentation of the digital content on display devices in or near the geographic locations.

17. The method of claim 16, wherein the first digital content includes a movie preview featuring the first toy, and the second digital content includes a movie preview featuring the second toy.

18. The method of claim 15, wherein the unlocking of the digital content related to the toys associated with the users comprises unlocking virtual content related to the toys within instances of the virtual space implemented on client computing platforms associated with the users.

19. The method of claim 18, wherein the virtual content related to the toys within a virtual space comprises one or more of a skill, a language, a power, a quest, a pet, a level, a ride, a weapon, a character, a virtual good, or a scene.

20. The method of claim 15, wherein the unlocked digital content is available for immediate and/or later access by the users via the objects associated with the user accounts.

21. The method of claim 15, further comprising temporarily unlocking the digital content related to the toys associated with the users until the objects are no longer detected in the predetermined geographic locations.

22. The method of claim 15, further comprising generating output signals conveying information related to presence of the first object in the first predetermined geographic location and a second predetermined geographic location, detecting whether the first object has been in the first predetermined geographic location and then the second predetermined geographic location, and unlocking third digital content responsive to detection of the first object in the first predetermined geographic location and then the second predetermined geographic location.

* * * * *